(12) United States Patent
Chakra et al.

(10) Patent No.: US 9,762,606 B2
(45) Date of Patent: *Sep. 12, 2017

(54) IMAGE VULNERABILITY REPAIR IN A NETWORKED COMPUTING ENVIRONMENT

(71) Applicant: International Business Machines Corporation, Armonk, NY (US)

(72) Inventors: Al Chakra, Apex, NC (US); Christopher J. Dawson, Arlington, VA (US); Yu Deng, Yorktown Heights, NY (US); Rick A. Hamilton, II, Charlottesville, VA (US); Jenny S. Li, Danbury, CT (US); Liangzhao Zeng, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/268,966

(22) Filed: Sep. 19, 2016

(65) Prior Publication Data
US 2017/0006056 A1  Jan. 5, 2017

Related U.S. Application Data

(63) Continuation of application No. 14/727,906, filed on Jun. 2, 2015, now Pat. No. 9,497,209, which is a
(Continued)

(51) Int. Cl.
| | | |
|---|---|---|
| *H04L 29/06* | (2006.01) | |
| *G06F 21/55* | (2013.01) | |
| *G06F 21/57* | (2013.01) | |

(52) U.S. Cl.
CPC ......... *H04L 63/1433* (2013.01); *G06F 21/55* (2013.01); *G06F 21/577* (2013.01); *H04L 63/02* (2013.01)

(58) Field of Classification Search
CPC ..... H04L 63/1433; H04L 63/02; G06F 21/55; G06F 21/577
(Continued)

(56) References Cited

U.S. PATENT DOCUMENTS

| | | |
|---|---|---|
| 6,907,531 B1 | 6/2005 | Dodd et al. |
| 7,308,712 B2 | 12/2007 | Banzhof |

(Continued)

OTHER PUBLICATIONS

Maitland, J., "Keeping Control Isn't Easy", Chapter 4: Cloud-Based Infrastructure, SearchCloudComputing.com, Publication Date: Oct. 2009, 17 pages.
(Continued)

*Primary Examiner* — Michael S McNally
(74) *Attorney, Agent, or Firm* — William H. Hartwell; Maxine L. Barasch; Keohane & D'Alessandro PLLC

(57) ABSTRACT

Embodiments of the present invention provide an approach to repair vulnerabilities (e.g., security vulnerabilities) in images (e.g., application images) in a networked computing environment (e.g., a cloud computing environment). Specifically, an image is checked for vulnerabilities using a database of known images and/or vulnerabilities. If a vulnerability is found, a flexible/elastic firewall is established around the image so as to isolate the vulnerability. Once the firewall has been put in place, the vulnerability can be repaired by a variety of means such as upgrading the image, quarantining the image, discarding the image, and/or generating a new image. Once the image has been repaired, the firewall can be removed.

20 Claims, 5 Drawing Sheets

Related U.S. Application Data continuation of application No. 14/156,665, filed on Jan. 16, 2014, now Pat. No. 9,094,446, which is a continuation of application No. 12/951,373, filed on Nov. 22, 2010, now Pat. No. 8,646,086.

(58) Field of Classification Search
USPC .......................................................... 726/25
See application file for complete search history.

(56) References Cited

U.S. PATENT DOCUMENTS

| | | | |
|---|---|---|---|
| 7,437,764 B1* | 10/2008 | Sobel .................... | G06F 21/562 713/176 |
| 8,646,086 B2 | 2/2014 | Chakra et al. | |
| 9,094,446 B2 | 7/2015 | Chakra et al. | |
| 2003/0229810 A1 | 12/2003 | Bango | |
| 2005/0091542 A1* | 4/2005 | Banzhof ............... | G06F 21/577 726/4 |
| 2005/0091558 A1 | 4/2005 | Chess et al. | |
| 2006/0143688 A1 | 6/2006 | Futoransky et al. | |
| 2006/0191010 A1 | 8/2006 | Benjamin | |
| 2007/0130624 A1* | 6/2007 | Shah .................... | G06F 21/566 726/24 |
| 2007/0204030 A1* | 8/2007 | Mimura ................. | G06F 9/505 709/223 |
| 2007/0250595 A1 | 10/2007 | Landfield | |
| 2008/0244723 A1* | 10/2008 | Brewster ............ | H04L 63/0227 726/11 |
| 2009/0100522 A1 | 4/2009 | Kim et al. | |
| 2010/0088150 A1 | 4/2010 | Mazhar et al. | |
| 2010/0131948 A1 | 5/2010 | Ferris | |
| 2010/0169975 A1 | 7/2010 | Stefanidakis et al. | |
| 2011/0289584 A1* | 11/2011 | Palagummi .......... | G06F 21/562 726/24 |
| 2012/0131677 A1 | 5/2012 | Chakra et al. | |
| 2014/0137258 A1 | 5/2014 | Chakra et al. | |
| 2015/0264076 A1 | 9/2015 | Chakra et al. | |

OTHER PUBLICATIONS

Mell et al., "The NIST Definition of Cloud Computing", National Institute of Standards and Technology, Information Technology Laboratory, Version 15, Oct. 7, 2009, 2 pages.

Michael S. McNally, USPTO Office Action, U.S. Appl. No. 12/951,373, Notification Date Jun. 26, 2013, 22 pages.

Michael S. McNally, USPTO Notice of Allowance and Fee(s) Due, U.S. Appl. No. 12/951,373, Date Mailed Sep. 30, 2013, 27 pages.

Michael S. McNally, USPTO Office Action, U.S. Appl. No. 14/156,665, Notification Date Dec. 5, 2014, 19 pages.

Michael S. McNally, USPTO Notice of Allowance and Fee(s) Due, U.S. Appl. No. 14/156,665, Date Mailed Mar. 19, 2015, 17 pages.

Michael S. McNally, USPTO Office Action, U.S. Appl. No. 14/727,906, Notification Date Apr. 14, 2016, 18 pages.

Michael S. McNally, USPTO Notice of Allowance and Fee(s) Due, U.S. Appl. No. 14/727,906, Date Mailed Jul. 20, 2016, 12 pages.

\* cited by examiner

IMAGE VULNERABILITY REPAIR IN A NETWORKED COMPUTING ENVIRONMENT

CROSS-REFERENCE TO RELATED APPLICATIONS

This patent document is a continuation of, and claims the benefit of, co-pending and co-owned U.S. patent application Ser. No. 14/727,906, filed Jun. 2, 2015, which is a continuation of commonly owned U.S. patent application Ser. No. 14/156,665, filed Jan. 16, 2014, issued Jul. 28, 2015 as U.S. Pat. No. 9,094,446, which is a continuation of commonly owned U.S. patent application Ser. No. 12/951,373, filed Nov. 22, 2010, issued Feb. 4, 2014 as U.S. Pat. No. 8,646,086. The entire contents of each of the aforesaid patent applications are herein incorporated by reference.

TECHNICAL FIELD

The present invention generally relates to image (e.g., application image) repair. Specifically, the present invention relates to image vulnerability repair within a networked computing environment such as a cloud computing environment.

BACKGROUND

The cloud computing environment is an enhancement to the predecessor grid environment, whereby multiple grids and other computation resources may be further abstracted by a cloud layer, thus making disparate devices appear to an end-consumer as a single pool of seamless resources. These resources may include such things as physical or logical compute engines, servers and devices, device memory, and storage devices.

When a "potentially-problematic" image has to be installed on a virtual (or physical) machine, the installation and execution of such an image can create a security exposure to the enterprise. The pervasiveness of cloud computing creates a significant issue in managing a large quantity of images that get created by users who utilize them. Specifically, this can result in administrative security challenges. For example, the images that are created on persistent physical media as dormant images for an unknown length of time will likely miss one or a plurality of patches, updates, fixes, and upgrades, some of which are critical enough not only for the image's stability by itself, but also for the stability of the entire network. In recent years, multiple examples of security vulnerabilities have been discovered in enterprise applications, operating systems, and web browsers and other software that may make up or be a part of an image. Such vulnerabilities may allow malicious programs and perpetrators to manipulate the image content, and even more dangerously, hijack such images to inflict serious and damaging effects on the enterprise network.

SUMMARY

Embodiments of the present invention provide an approach to repair vulnerabilities (e.g., security vulnerabilities) in images (e.g., application images) in a networked computing environment (e.g., a cloud computing environment). Specifically, an image is checked for vulnerabilities using a database of known images and/or vulnerabilities. If a vulnerability is found, a flexible/elastic firewall is established around the image so as to isolate the vulnerability. Once the firewall has been put in place, the vulnerability can be repaired by a variety of means such as upgrading the image, quarantining the image, discarding the image, and/or generating a new image. Once the image has been repaired, the firewall can be removed.

A first aspect of the present invention provides a method for repairing image vulnerability in a networked computing environment, comprising: identifying an image in the networked computing environment having a vulnerability, the image being identified based on a database of known vulnerabilities; establishing a firewall around the image to isolate the vulnerability; repairing the image to remove the vulnerability; and removing the firewall.

A second aspect of the present invention provides a system for repairing image vulnerability in a networked computing environment, comprising: a bus; a processor coupled to the bus; and a memory medium coupled to the bus, the memory medium comprising instructions to: identify an image in the networked computing environment having a vulnerability, the image being identified based on a database of known vulnerabilities; establish a firewall around the image to isolate the vulnerability; repair the image to remove the vulnerability; and remove the firewall.

A third aspect of the present invention provides a computer program product for repairing image vulnerability in a networked computing environment, the computer program product comprising a computer readable storage media, and program instructions stored on the computer readable storage media, to: identify an image in the networked computing environment having a vulnerability, the image being identified based on a database of known vulnerabilities; establish a firewall around the image to isolate the vulnerability; repair the image to remove the vulnerability; and remove the firewall.

A fourth aspect of the present invention provides a method for deploying a system for repairing image vulnerability in a networked computing environment, comprising: deploying a computer infrastructure being operable to: identify an image in the networked computing environment having a vulnerability, the image being identified based on a database of known vulnerabilities; establish a firewall around the image to isolate the vulnerability; repair the image to remove the vulnerability; and remove the firewall.

BRIEF DESCRIPTION OF THE DRAWINGS

These and other features of this invention will be more readily understood from the following detailed description of the various aspects of the invention taken in conjunction with the accompanying drawings in which.

Figure 1:
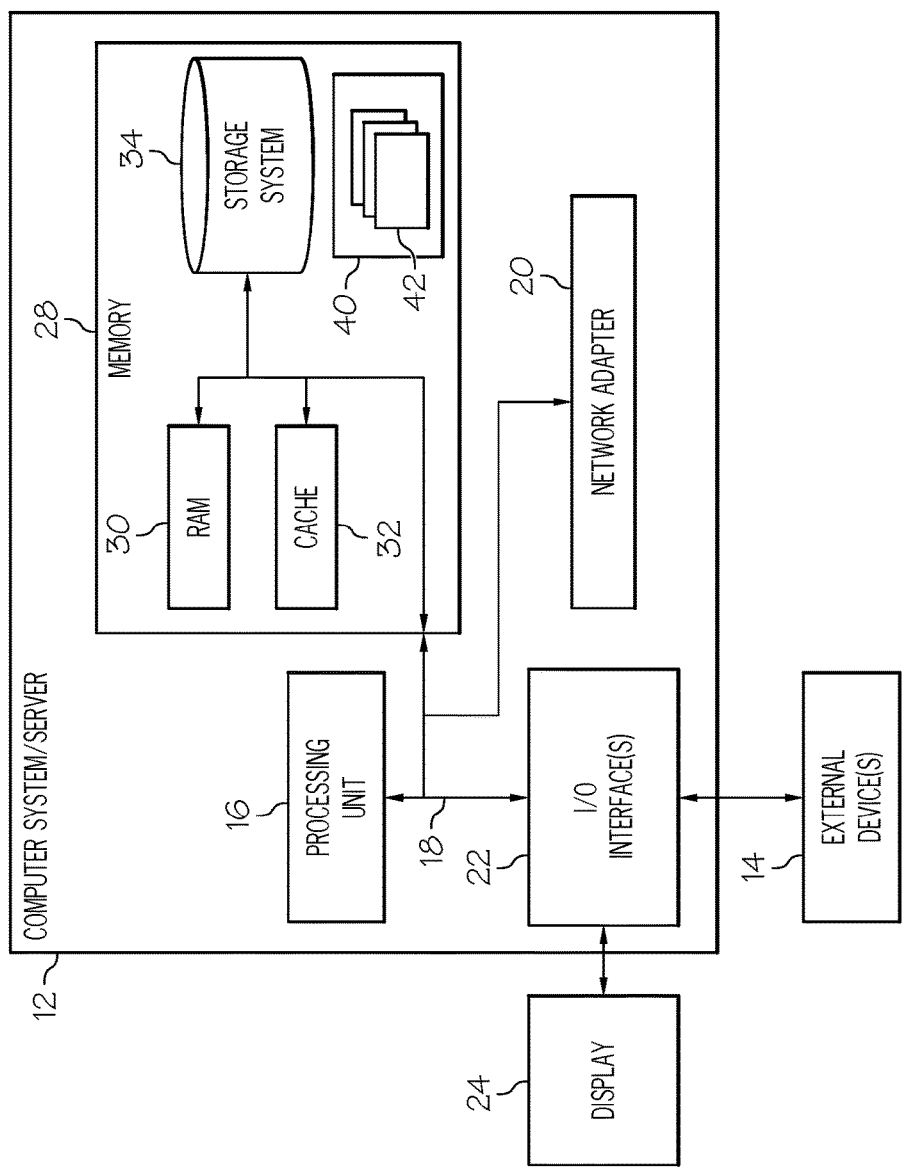
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach to repair vulnerabilities (e.g., security vulnerabilities) in images (e.g., application images) in a networked computing environment (e.g., a cloud computing environment). Specifically, an image is checked for vulnerabilities using a database of known images and/or vulnerabilities. If a vulnerability is found, a flexible/elastic firewall is established around the image so as to isolate the vulnerability. Once the firewall has been put in place, the vulnerability can be repaired by a variety of means such as upgrading the image, quarantining the image, discarding the image, and/or generating a new image. Once the image has been repaired, the firewall can be removed.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being impl3

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
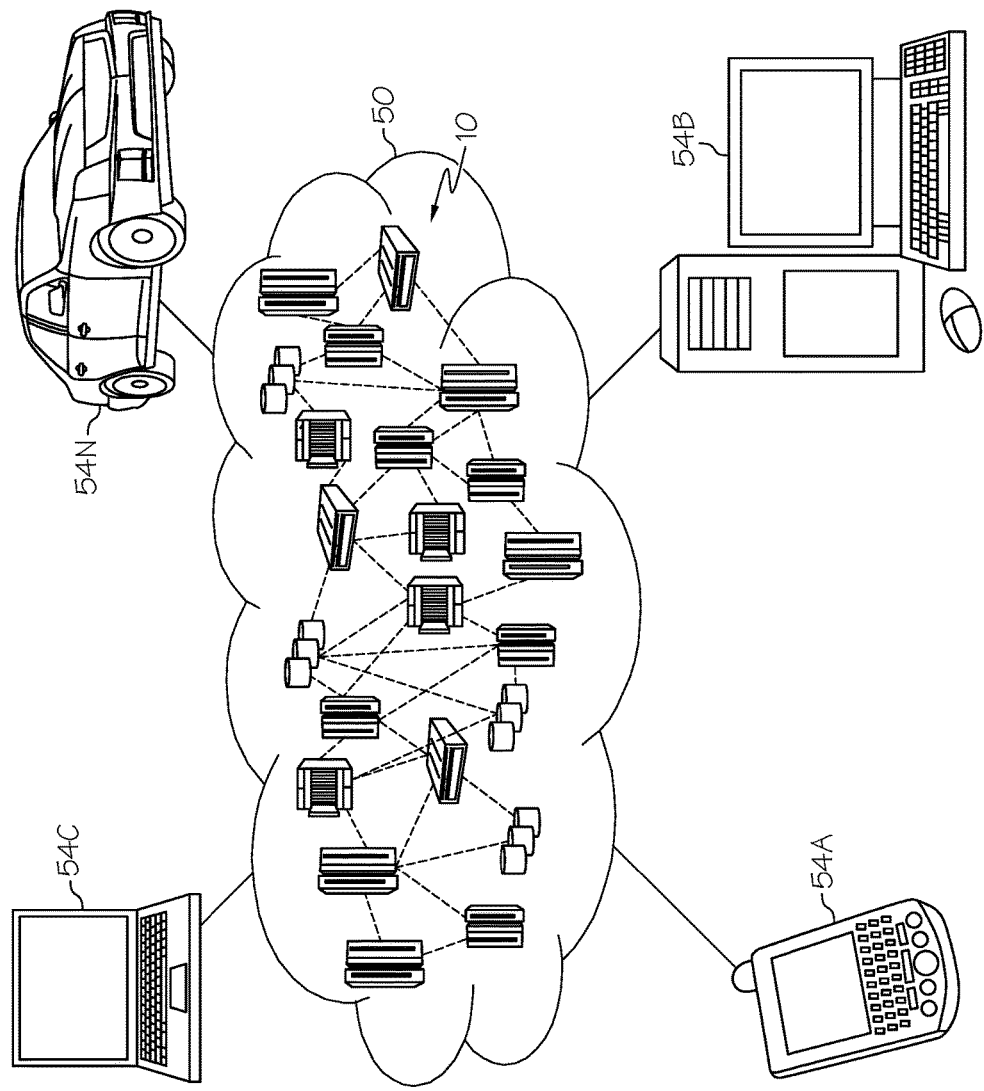
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
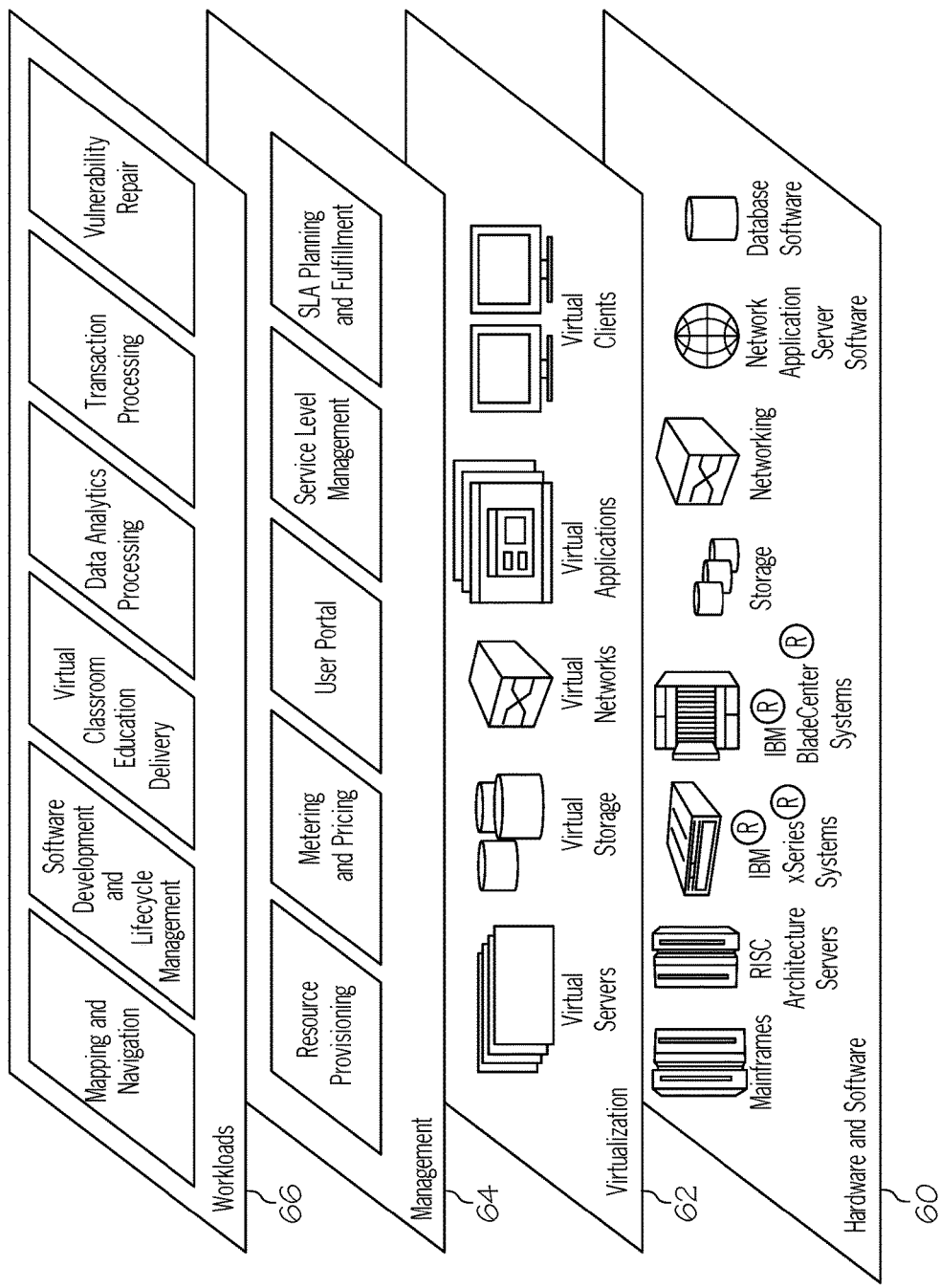
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and vulnerability repair. As mentioned above, all of the foregoing examples described with respect to FIG. 3 are illustrative only, and the invention is not limited to these examples.

It is understood all functions of the present invention as described herein are typically may be performed by the vulnerability repair function, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

As indicated above, the present invention creates, maintains and/or utilizes a database of know defects to identify images having vulnerabilities. If a vulnerable image is identified, a flexible/elastic firewall is established around the vulnerable image while the image is repaired to isolate the vulnerability. Once the image has been repaired, the firewall can be removed and the database updated. This process is further described as follows:

Creation of a database catalog for known critical defects/vulnerabilities: The gathering of such defects typically come from: (1) defects that are published by the enterprises owning products used and stored in the cloud; and/or (2) autonomically as updates get stored to the database. This classification of defects is intercepted during the updates with metadata provided by the enterprise. In one embodiment, updates applied to this database can be unlimited since the discovery of defects and the creation of patches can also potentially be unlimited.

Identifying images with vulnerabilities: As an image is being executed/used (e.g., known as "stood-up" in the art) a routine is launched to compare the component of the image that is cataloged in the cloud with the database mentioned above. The images that are non-compliant (e.g., those images having vulnerabilities) will be identified.

Creation of a flexible firewall: Once a vulnerability is discovered, such an image gets locked down behind a temporal and flexible firewall to stop any packets travelling from that image outside the cloud or to other images within the same cloud. Access control to the "vulnerable" image can be restricted to people with administrative rights or power users, not regular end users. In one embodiment, a separate flexible firewall can be created for each non-compliant image. Alternatively, multiple flexible firewalls that contain non-compliant images with similar characteristics can be grouped into one flexible firewall. In this case, the upgrading and quarantining or re-imaging can be performed for all these images.

Heath/Vulnerability/Defect Check Processing (e.g., fixing/repairing the image either by upgrading, quarantining, or re-imaging): In one example, a flexible firewall allows known fixes, the lack of which prompted the quarantine routine to be launched, to traverse from a database or other specified locations to the areas of vulnerability to remedy the vulnerabilities. In another example, the flexible firewall will enclose another image with the vulnerable image. This other image is a copy of a healthy repository of fixes related to the vulnerability issue at hand and the firewall creates a tight network around the only two images (the "sick" image and the "rescue" image) so no other damage occurs. In one embodiment, once the patching is completed and the scan verifies that the vulnerabilities are removed, the firewall either gets deleted/removed or travels to another image or set of images. In the example where multiple non-compliant images with similar characteristics are bounded by the same flexible firewall, images can be released as soon as they are repaired/fixed, or images can be released all at the same time, and the firewall will be removed. In another embodiment, the flexible firewall can remain. This is to facilitate the healing of future vulnerable images with similar non-compliant characteristics.

Figure 4:
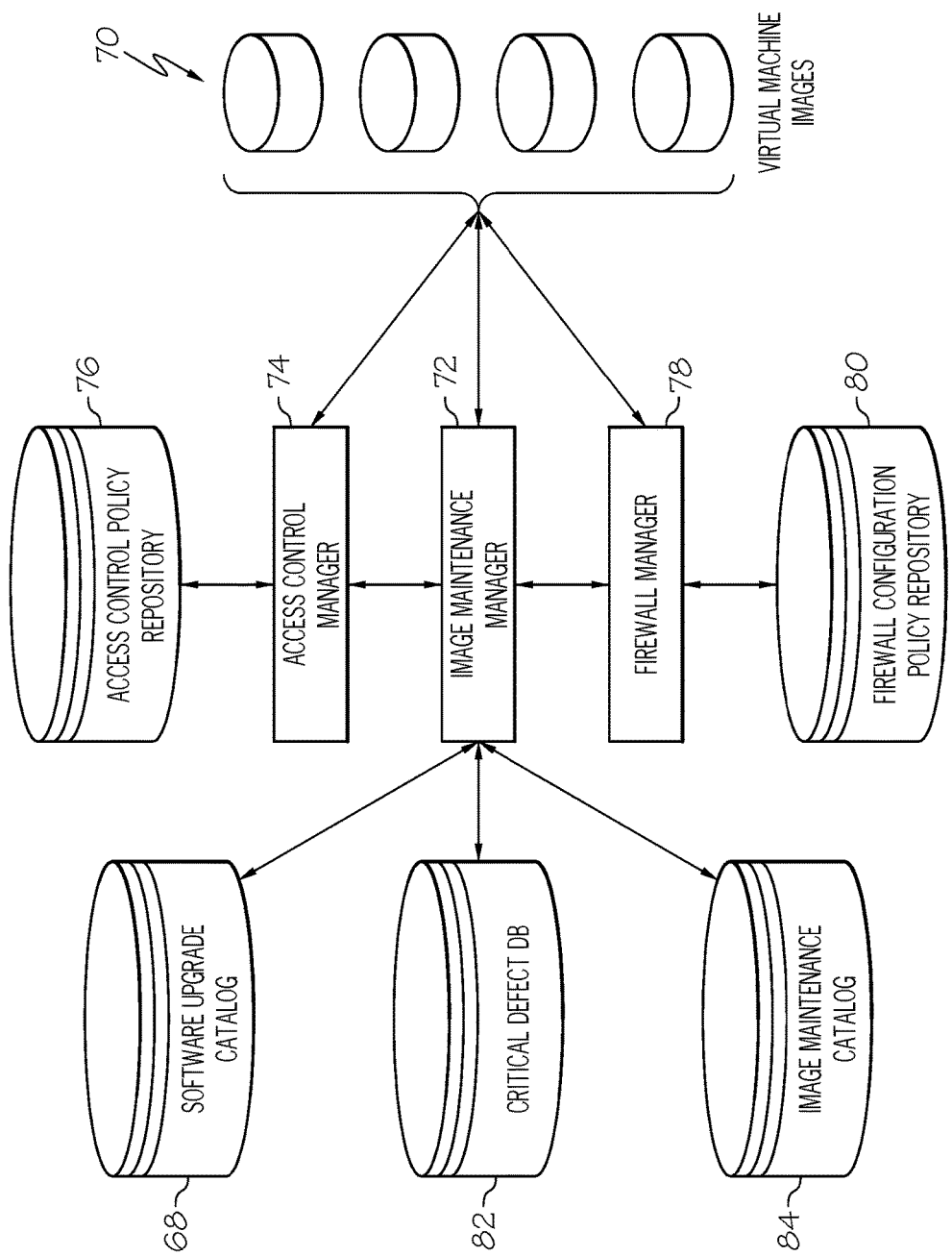
FIG. 4 depicts an architectural diagram according to an embodiment of the present invention.

Referring now to FIG. 4, an architecture diagram enabling the above concepts will be disclosed. As depicted, the diagram of FIG. 4 shows the following components having associated functions.

Image maintenance manager 72. Handles requests for an image 70 update and/or compliance/vulnerability checking. Manager 72 interfaces with critical defect database (DB) 82 for the latest defect(s). It also interfaces with image maintenance catalog 84 to locate any problematic images. Still yet, image maintenance manager 72 invokes firewall manager 78 to create a flexible firewall around problematic images. Then, it locates the software to be upgraded from software upgrade catalog 86, and executes the upgrade on the problematic images.

Critical defect DB 82: Keeps track of defects of all applications/images and their versions and urgency.

Image maintenance catalog 84: Keeps track of the image upgrade information, including versions of the operating system, software, and patches and the date that the patches are applied.

Software upgrade catalog 68: A repository of software applications including patches that can be downloaded.

Firewall manager 78: Handles the creation and deletion of a flexible firewall around a target image. Along these lines, firewall manager 78 leverages firewall configuration policy repository 80 to create and configure (and eventually remove the firewall) in a manner that best isolates the vulnerability.

Access control manager 74: Interfaces with access control policy repository 76 to handle the authorization and authentication of images 70 and applications.

Figure 5:
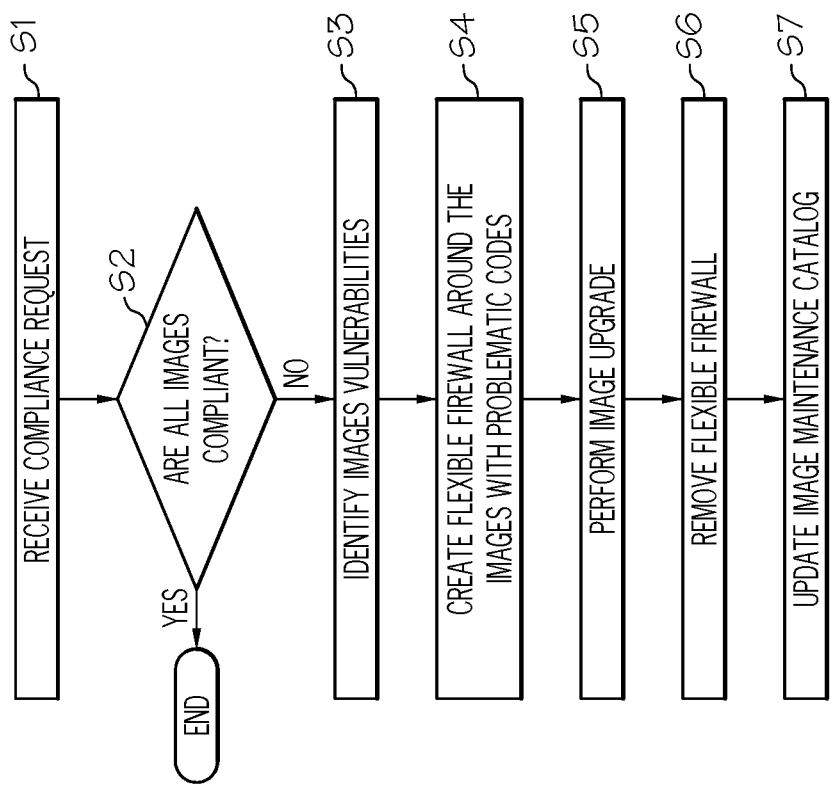
FIG. 5 depicts a method flow diagram according to an embodiment of the present invention.

Referring now to FIG. 5, a method flow diagram according to an embodiment of the present invention is shown. As depicted, in step S1, a compliance request is received. In step S2, it is determined if all images are compliant. This is typically determined by consulting a database/catalog of known vulnerabilities. If all images are deemed to be compliant, the process can end. If not, the process flows to step S3 where images with problematic codes and/or other vulnerabilities are identified. In step S4, a flexible firewall is established around the vulnerable images. In step S5, a repair such as an image upgrade will be performed. In step S6, the firewall can be removed and the database/catalog can be updated. In step S7, the database/catalog can be updated accordingly.

While shown and described herein as a vulnerability repair solution, it is understood that the invention further provides various alternative embodiments. For example, in one embodiment, the invention provides a computer-readable/useable medium that includes computer program code to enable a computer infrastructure to provide vulnerability repair functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide vulnerability repair functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for vulnerability repair. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for repairing image vulnerability in a networked computing environment, comprising:
    identifying a first image in the networked computing environment having a vulnerability;
    establishing a firewall around the first image and a second image, having a similar vulnerability to the first image, to isolate the vulnerability of the first image and the second image;
    repairing the first image and the second image to remove the vulnerability; and
    releasing the first image and the second image from the firewall.

2. The method of claim 1, the first image being an application image.

3. The method of claim 1, the vulnerability being a security vulnerability.

4. The method of claim 1, wherein the identifying is based on a database of known vulnerabilities.

5. The method of claim 4, further comprising updating the database based on the repairing.

6. The method of claim 1, wherein the networked computing environment comprises a cloud computing environment.

7. The method of claim 1, wherein a service solution provider provides a computer infrastructure that performs the method for one or more consumers.

8. A system for repairing image vulnerability in a networked computing environment, comprising:
    a bus;
    a processor coupled to the bus; and
    a memory medium coupled to the bus, the memory medium comprising instructions to:
    identify a first image in the networked computing environment having a vulnerability;
    establish a firewall around the first image and a second image, having a similar vulnerability to the first image, to isolate the vulnerability of the first image and the second image;
    repair the first image and the second image to remove the vulnerability; and
    release the first image and the second image from the firewall.

9. The system of claim 8, the first image being an application image.

10. The system of claim 8, the vulnerability being a security vulnerability.

11. The system of claim 8, wherein the identifying is based on a database of known vulnerabilities.

12. The system of claim 11, the memory medium further comprising instructions to update the database based on the repair.

13. The system of claim 8, wherein the networked computing environment comprises a cloud computing environment.

14. A computer program product for repairing image vulnerability in a networked computing environment, the computer program product comprising a computer readable storage media, and program instructions stored on the computer readable storage media, to:
    identify a first image in the networked computing environment having a vulnerability;
    establish a firewall around the first image and a second image, having a similar vulnerability to the first image, to isolate the vulnerability of the first image and the second image;
    repair the first image and the second image to remove the vulnerability; and
    release the first image and the second image from the firewall.

15. The computer program product of claim 14, the first image being an application image.

16. The computer program product of claim 14, the vulnerability being a security vulnerability.

17. The computer program product of claim 14, wherein the identifying is based on a database of known vulnerabilities.

18. The computer program product of claim 17, the database being populated based on defects that are published by enterprises owning products used and stored in the networked computing environment.

19. The computer program product of claim 15, further comprising program instructions stored on the computer readable storage media to update the database based on the repair.

20. The computer program product of claim 19, wherein the networked computing environment comprises a cloud computing environment.

* * * * *